(12) United States Patent
Yokota et al.

(10) Patent No.: US 11,847,389 B2
(45) Date of Patent: Dec. 19, 2023

(54) DEVICE AND METHOD FOR OPTIMIZING AN INPUT PARAMETER IN A PROCESSING OF A SEMICONDUCTOR

(71) Applicants: Kioxia Corporation, Tokyo (JP); KABUSHIKI KAISHA TOSHIBA, Tokyo (JP)

(72) Inventors: Satoru Yokota, Yokohama (JP); Daiki Kiribuchi, Ota (JP); Takeichiro Nishikawa, Yokohama (JP); Soh Koike, Tachikawa (JP); Takashi Tsurugai, Fujisawa (JP)

(73) Assignees: Kioxia Corporation, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 374 days.

(21) Appl. No.: 17/014,759

(22) Filed: Sep. 8, 2020

(65) Prior Publication Data

US 2021/0248293 A1    Aug. 12, 2021

(30) Foreign Application Priority Data

Feb. 7, 2020 (JP) .................................. 2020-020048

(51) Int. Cl.
  *G06F 30/27* (2020.01)
  *G06N 3/086* (2023.01)
  (Continued)

(52) U.S. Cl.
  CPC .............. *G06F 30/27* (2020.01); *G06N 3/086* (2013.01); *G06N 7/01* (2023.01); *G06F 2111/04* (2020.01)

(58) Field of Classification Search
  CPC .......... G06F 30/20; G06F 30/15; G06F 30/30; G06F 30/34; G06F 30/347; G06F 30/323;
  (Continued)

(56) References Cited

U.S. PATENT DOCUMENTS 5,535,134 A * 7/1996 Cohn ...................... G06F 30/39
                                                                  716/112
7,142,991 B2 * 11/2006 Hathaway ............. G06F 30/367
                                                                  716/108
(Continued)

FOREIGN PATENT DOCUMENTS

JP    2018-73360 A    5/2018
JP    2020-27370 A    2/2020
WO    WO 2017/047309 A1    3/2017

OTHER PUBLICATIONS

Anders Kirk Uhrenholt, et al., "Efficient Bayesian Optimization for Target Vector Estimation", Proceedings of the 22$^{nd}$ International Conference on Artificial Intelligence and Statistics (AISTATS), vol. 89, 2019, 10 pgs.

(Continued)

*Primary Examiner* — Kibrom K Gebresilassie
(74) *Attorney, Agent, or Firm* — Oblon, McClelland, Maier & Neustadt, L.L.P.

(57) ABSTRACT

An optimization device includes an output data acquisitor that acquires output data having a second number of dimensions obtained by performing an experiment or a simulation, an evaluation value calculator that calculates and outputs an evaluation value of the output data, a features extractor that extracts an output data features having a third number of dimensions different from the second number of dimensions, an input parameter converter that generates a conversion parameter related to the output data features predicted from the input parameters, a next input parameter determinator that determines a next input parameter to be acquired by the output data acquisitor, based on the conversion parameter and the corresponding evaluation value, and an iterative determinator that repeats processes of the output data acquisitor, the input/output data storage, the evaluation (Continued)

value calculator, the features extractor, the input parameter converter, and the next input parameter determinator.

23 Claims, 14 Drawing Sheets

(51) Int. Cl.
  *G06N 7/01* (2023.01)
  *G06F 111/04* (2020.01)
(58) Field of Classification Search
  CPC .. G06F 30/38; G06F 2111/00; G06F 2119/22; G06F 30/337; G06F 30/31; G06F 30/32; G06F 2111/20; G06F 30/333; G06F 30/343; G06F 30/27; G06F 2111/04; G01M 17/00; G06N 7/01; G06N 3/086
  See application file for complete search history.

(56) References Cited

U.S. PATENT DOCUMENTS

| | | | |
|---|---|---|---|
| 7,428,514 B2* | 9/2008 | Jin | G06N 3/126 706/45 |
| 10,607,358 B2 | 3/2020 | Kaneko | |
| 11,409,923 B1* | 8/2022 | Marguerin | G06F 30/20 |
| 11,461,515 B2* | 10/2022 | Kiribuchi | G06F 17/18 |
| 2003/0191728 A1* | 10/2003 | Kulkarni | G06N 3/086 706/31 |
| 2004/0031007 A1* | 2/2004 | Hirakimoto | G06F 30/39 716/113 |
| 2004/0031008 A1* | 2/2004 | Satoh | G06F 30/39 716/113 |
| 2018/0300609 A1* | 10/2018 | Krishnamurthy | G06N 3/088 |
| 2020/0050717 A1* | 2/2020 | Kiribuchi | G06F 30/20 |
| 2020/0349470 A1* | 11/2020 | Ikeda | G06N 7/005 |

OTHER PUBLICATIONS

Raul Astudillo, et al., "Bayesian Optimization of Composite Functions", Proceedings of the 36th International Conference on Machine Learning, vol. 97, 2019, 10 pgs.

Ziyu Wang, et al., "Bayesian Optimization in a Billion Dimensions via Random Embeddings", Journal of Artificial Intelligence Research, vol. 55, Issue 1, Jan. 2016, pp. 361-387.

Ryan-Rhys Griffiths, et al., "Constrained Bayesian optimization for automatic chemical design using variational autoencoders", Chemical Science 11, 2020, pp. 577-586.

* cited by examiner

| x1  | 0.5  |
|-----|------|
| x2  | 230  |
| x3  | 12   |
| ... | ...  |
| x38 | 0.35 |

FIG. 2A

| | |
|---|---|
| y1 | 0.5 |
| y2 | 230 |
| y3 | 12 |
| ... | ... |
| y8 | 0.35 |
| ... | ... |
| y800 | 1 |

FIG. 2B

| x1 | x2 | x3 | ... | x38 | y1 | y2 | y3 | ... | y800 |
|---|---|---|---|---|---|---|---|---|---|
| 0.5 | 230 | 12 | ... | 0.35 | 0.5 | 230 | 12 | ... | 1 |
| 1 | 260 | 37 | ... | 0.42 | 0.33 | 404 | 6 | ... | 9 |
| ... | ... | ... | ... | ... | ... | ... | ... | ... | ... |
| 2 | 300 | 40 | ... | 0.58 | 0.71 | 594 | 22 | ... | 0 |

FIG. 3

| y1 | y2 | y3 | ... | y800 | v1 | v2 | v3 | ... | v38 |
|------|-----|-----|-----|------|-----|-----|-----|-----|-----|
| 0.5 | 230 | 12 | ... | 1 | 10 | 2 | 54 | ... | 0.9 |
| 0.33 | 404 | 6 | ... | 9 | 0.5 | 34 | 73 | ... | 25 |
| ... | ... | ... | ... | ... | ... | ... | ... | ... | ... |
| 0.71 | 594 | 22 | ... | 0 | 0.9 | 63 | 41 | ... | 45 |

FIG. 4

|        | y1  | y2  | y3  | ... | y800 |
|--------|-----|-----|-----|-----|------|
| WEIGHT | 0.1 | 0.1 | 0.1 | ... | 0.02 |

FIG.12

DEVICE AND METHOD FOR OPTIMIZING AN INPUT PARAMETER IN A PROCESSING OF A SEMICONDUCTOR

CROSS REFERENCE TO RELATED APPLICATIONS

This application is based upon and claims the benefit of priority from the prior Japanese Patent Application No. 2020-20048, filed on Feb. 7, 2020, the entire contents of which are incorporated herein by reference.

FIELD

One embodiment of the present invention relates to an optimization device and an optimization method.

BACKGROUND

Simulators are used for various purposes. For example, a simulator can be used for the purpose of estimating output data by inputting input parameters into a simulator, and updating input parameters so that the output data becomes ideal output data.

When the simulator is used to simulate the operation of a complicated event, the output data may be multidimensional. When the output data is multidimensional, a huge amount of calculation processing is required to update the input parameters. It is possible to perform simulation after extracting the output data of some important dimensions from the multidimensional output data, but it is not easy to manually extract the output data of some dimensions from the multidimensional output data.

BRIEF DESCRIPTION OF THE DRAWINGS

FIG. 2A is a diagram showing a pair of input parameters and corresponding output data;

FIG. 2B is a diagram showing an example of output data;

FIG. 3 is a diagram showing an example of data stored in an input/output data storage unit;

FIG. 4 is a diagram showing an example in which output data and corresponding output data features are arranged as a pair in the same row;

FIG. 12 is a diagram showing an example of a method of storing each dimension of output data and a corresponding weight.

DETAILED DESCRIPTION

According to one embodiment, an optimization device includes:

an output data acquisitor that acquires output data having a second number of dimensions obtained by performing an experiment or a simulation based on input parameters having a first number of dimensions;

an input/output data storage that stores the input parameters and the corresponding output data as a pair;

an evaluation value calculator that calculates and outputs an evaluation value of the output data;

a features extractor that extracts output data features having a third number of dimensions different from the second number of dimensions;

an input parameter converter that generates a conversion parameter related to the output data features predicted from the input parameters;

a next input parameter determinator that determines a next input parameter to be acquired by the output data acquisitor, based on the conversion parameter and the corresponding evaluation value; and an iterative determinator that repeats processes of the output data acquisitor, the input/output data storage, the evaluation value calculator, the features extractor, the input parameter converter, and the next input parameter determinator until a predetermined condition is satisfied.

Embodiments of an optimization device and an optimization method will be described below with reference to the drawings. Hereinafter, the main constituent parts of the optimization device and the optimization method will be mainly described, but the optimization device and the optimization method may have constituent parts and functions which are not illustrated or described. The following description does not exclude constituent parts and functions not illustrated or described.

Figure 1:
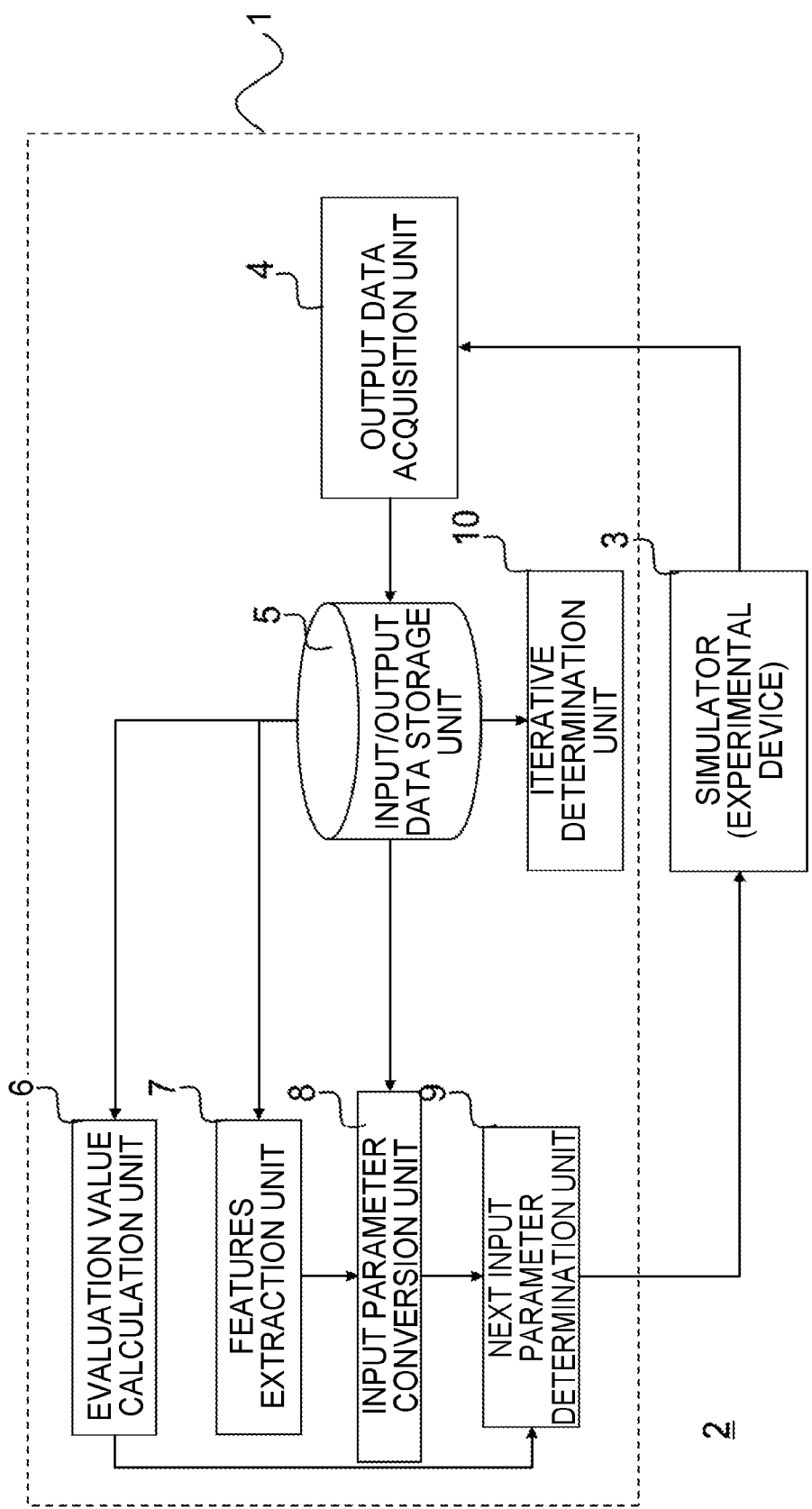
FIG. 1 is a block diagram showing a schematic configuration of a simulation system including an optimization device.

FIG. 1 is a block diagram showing a schematic configuration of a simulation system 2 including an optimization device 1 according to an embodiment. The simulation system 2 in FIG. 1 includes the optimization device 1 and a simulator 3. The simulator 3 executes simulation based on input parameters and outputs output data indicating the simulation result. The optimization device 1 optimizes the input parameters input (set) to the simulator 3.

The simulation system 2 in FIG. 1 can be composed of one or a plurality of computers. In this case, the computer executes a program for performing the processing operation of the optimization device 1 and a program for performing the processing operation of the simulator 3. Alternatively, at least part of the processing operations of the optimization device 1 and the simulator 3 may be executed by dedicated hardware (for example, a semiconductor device such as a signal processor).

The optimization device 1 in FIG. 1 does not necessarily need to be connected to the simulator 3. For example, instead of the simulator 3, the optimization device 1 of FIG. 1 may be used together with an experimental device that performs various experiments. That is, the optimization device 1 of FIG. 1 is not always built in the simulation system 2.

The optimization device 1 of FIG. 1 includes an output data acquisition unit 4, an input/output data storage unit 5, an evaluation value calculation unit 6, a features extraction unit 7, an input parameter conversion unit 8, a next input parameter determination unit 9, and an iterative determination unit 10.

The output data acquisition unit 4 acquires output data indicating a result of an experiment or simulation based on the input parameters having a predetermined number of dimensions. In the present specification, it is assumed that a plurality of input parameters are used in an experiment or input to the simulator 3, and the number of input parameters (the number of items) is called the number of dimensions. The output data acquisition unit 4 may acquire not only the output data indicating the result of the simulation performed by the simulator 3 but also the output data indicating the experimental result. In this specification, it is assumed that the output data acquisition unit 4 acquires multidimensional output data. The following mainly describes a process of acquiring multidimensional output data from the simulator 3 and determining the next input parameter to the simulator 3, but it is also possible to acquire multidimensional output data from the experimental device instead of the simulator 3, and determine the next input parameter to the experimental device. In this way, the output data acquisition unit 4 acquires the output data having a second number of dimensions obtained by performing the experiment or simulation based on the input parameters having a first number of dimensions. For example, the second number of dimensions is larger than the first number of dimensions.

Figure 2A:
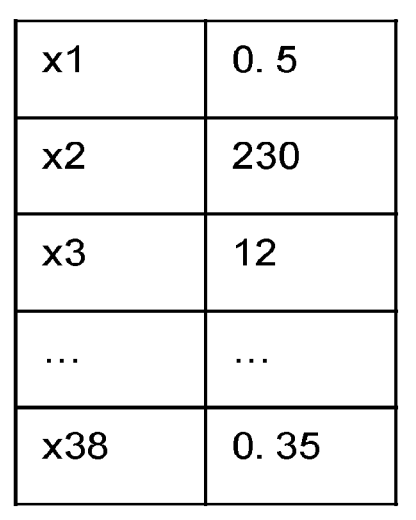

The input/output data storage unit 5 stores the input parameters and the corresponding output data as a pair. In the example of FIG. 2A, the input parameters include 38 items x1, x2, ..., x38, and each item has an individual value. The value of each item may be a continuous value, a discrete value, or a categorical variable. Each item of the input parameters may be a physical parameter such as temperature or pressure, or may be an experimental parameter such as processing time or processing condition. The number of items of the input parameters and the content of the item are arbitrary.

Figure 2B:
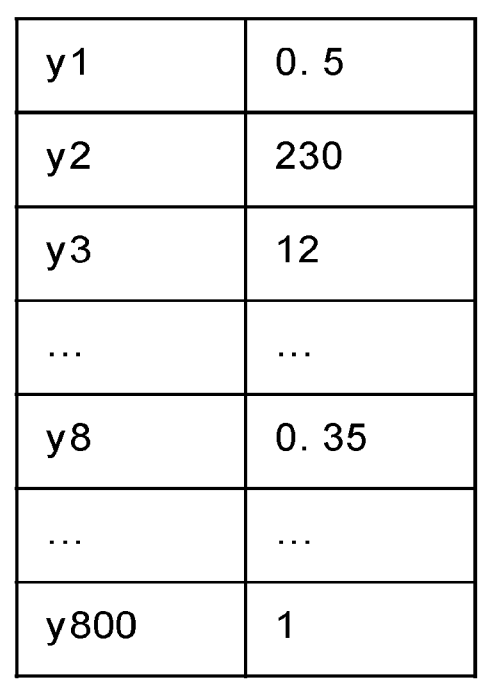

FIG. 2B is a diagram showing an example of output data. In the example of FIG. 2B, the output data includes 800 items y1, y2, ..., y800, and each item has an individual value. The output data indicates the result of an experiment by using the input parameters or the result of a simulation by inputting the input parameters into the simulator 3. More specifically, the output data may be detection data of various sensors used in the experiment, or may be physical characteristic values or measured values of the experiment result or the simulation result.

FIG. 3 is a diagram showing an example of data stored in the input/output data storage unit 5. In the example of FIG. 3, the input parameters of FIG. 2A and the corresponding output data of FIG. 2B are stored as a pair in the input/output data storage unit 5.

The evaluation value calculation unit 6 calculates an evaluation value of the output data. The evaluation value is a one-dimensional value for the input parameters. The evaluation value may be one of the output data obtained as a result of the experiment or simulation, or a value calculated by combining a plurality of output data obtained as a result of the experiment or simulation. For example, the difference between the output data obtained as the result of the experiment or simulation and ideal output data may be used as the evaluation value, or the sum or product of a plurality of output data obtained as the result of the experiment or simulation may be used as the evaluation value. It is sufficient that an evaluation value $f(x)$ is known to be calculated by inputting output data y to an evaluation value calculation function g. That is, when $f(x)=g(y)$, the evaluation value calculation function g may be a black box.

The features extraction unit 7 extracts the output data features in which the number of dimensions of the output data is changed to the number of dimensions of the input parameters. That is, the features extraction unit 7 extracts, from the output data having a second number of dimensions, the output data features having the third number of dimensions different from the second number of dimensions. For example, when the number of dimensions of the input parameters x is 38, the input parameter conversion unit 8 extracts 38-dimensional output data features of $v=(v1, v2, \ldots, v38)$ from 800-dimensional output data y of $y=(y1, y2, \ldots, y800)$.

The process of extracting the output data features from the output data may be a function $\varphi(y)$ of following Expression (1).

$$v = \varphi(y) \tag{1}$$

The function $\varphi(y)$ may use, for example, an output of an intermediate layer of a neural network that uses the output data as an input to an input layer and learns a weight that minimizes an error between an output from an output layer and the input to the input layer. More specifically, the output data features may be obtained using an autoencoder (AE). Alternatively, a variational autoencoder, a sparse autoencoder, a stacked autoencoder, a multilayer autoencoder, or a denoising autoencoder may be used. A self-organizing map may be used. As described above, the features extraction unit 7 may input the output data to the input layer of the neural network having the input layer, the intermediate layer, and the output layer, learn a weight of each path connecting the input layer, the intermediate layer, and the output layer so that the error between the output data that is input to the input layer and the data that is output from the output layer is minimized, and use the data output from the intermediate layer as the output data features.

Alternatively, the features extraction unit 7 may use, as the output data features, the dimension having the maximum variance in the output data. More specifically, Principal Component Analysis (PCA) or a multidimensional scaling method may be used.

Alternatively, the features extraction unit 7 may use, as the output data features, the dimension having the greatest independence in the output data. More specifically, Independence Component Analysis (ICA) may be used.

Alternatively, the features extraction unit 7 may set the dimension randomly selected from the dimensions of y as v, or may use the random mapping A to set $v=A(y)$.

Alternatively, the features extraction unit 7 may extract the output data features from the output data by arbitrarily combining the plurality of methods described above.

The process of extracting the output data features from the output data may be a function $\varphi(f(x), y)$ of following Expression (2), which uses the evaluation value $f(x)$ and the output data y as inputs.

$$v = \varphi(f(x), y) \tag{2}$$

For example, $\varphi(f(x), y)$ may be a function that outputs a dimension corresponding to a regression coefficient that exceeds a predetermined threshold among the regression coefficients when the evaluation value is predicted from the output data. More specifically, a linear regression is performed using $f(x)$ as an objective variable and y as an explanatory variable, and the regression coefficient is obtained, and dimensions of y may be selected in order from the dimension with the largest absolute value of the regression coefficient by the number of dimensions of the input parameters. Alternatively, a random forest may be used to calculate the feature importance, and the dimensions of y may be selected in order from the dimension with the highest importance by the number of dimensions of the input parameters.

FIG. 4 is a diagram showing an example in which the output data and the corresponding output data features are arranged as a pair in the same row. FIG. 4 shows an example of converting 800-dimensional output data y=(y1, y2, . . . , y800) into 38-dimensional output data features v=(v1, v2, . . . , v38). Each data in FIG. 4 may be stored in the input/output data storage unit 5 or a storage unit (not shown) provided separately from the input/output data storage unit 5.

The input parameter conversion unit 8 converts the input parameters stored in the input/output data storage unit 5 into a conversion parameter based on the output data features stored in the input/output data storage unit 5 or a storage unit (not shown) provided separately from the input/output data storage unit 5. That is, the input parameter conversion unit 8 generates a conversion parameter related to the output data features predicted from the input parameters. For example, the input parameter conversion unit 8 calculates a regression formula v=ψ(x) that predicts 38-dimensional output data features v=(v1, v2, . . . , v38) and uses the regression result z=ψ(x) as the conversion parameter. That is, ψ(x) is calculated from the input parameters x and the output data features v, and ψ(x) in which the error between v and ψ(x) becomes small is obtained.

For example, the sum of squared errors between v and ψ(x) may be calculated to find ψ(x) that minimizes the calculated sum of squared errors. As the regression method, linear regression, elastic net regression, random forest regression, or the like may be used. The conversion method of the input parameter conversion unit 8 may be changed each time an experiment or simulation is performed, or the conversion method may be fixed. In addition, the conversion method of the input parameter conversion unit 8 may be changed each time an experiment or simulation is performed a predetermined number of times.

The next input parameter determination unit 9 determines the next input parameter used in the experiment or input to the simulator 3 based on the pair of the above-mentioned conversion parameter and the corresponding evaluation value. That is, the next input parameter determination unit 9 determines the next input parameter to be acquired by the output data acquisition unit, based on the conversion parameter and the corresponding evaluation value.

For example, the next conversion parameter may be determined by using the black-box optimization method based on the pair of the conversion parameter and the corresponding evaluation value. The optimization method adopted may be a genetic algorithm, an evolution strategy, or a covariance matrix adaptation evolution strategy (CMA-ES). Also, Bayesian optimization may be used to determine the next conversion parameter.

After that, the next input parameter $x=\varphi^{-1}(z)$ is calculated from the next conversion parameter z using the inverse function $\varphi^{-1}(z)$ of conversion. The determined next input parameter may be displayed on a display, may be displayed on an experimental device or simulator using communication equipment, or may be directly output to an experimental device or simulator 3 using communication equipment.

The iterative determination unit 10 repeats processes of the output data acquisition unit 4, the input/output data storage unit 5, the evaluation value calculation unit 6, the features extraction unit 7, the input parameter conversion unit 8, and the next input parameter determination unit 9 until the predetermined condition is satisfied. Satisfying a predetermined condition may be, for example, when the number of experiments or simulations exceeds a threshold, when the elapsed time from the start of an experiment or simulation exceeds a threshold, or when the evaluation value exceeds (or falls below) a threshold. Alternatively, conditions that combine these may be used.

Figure 5:
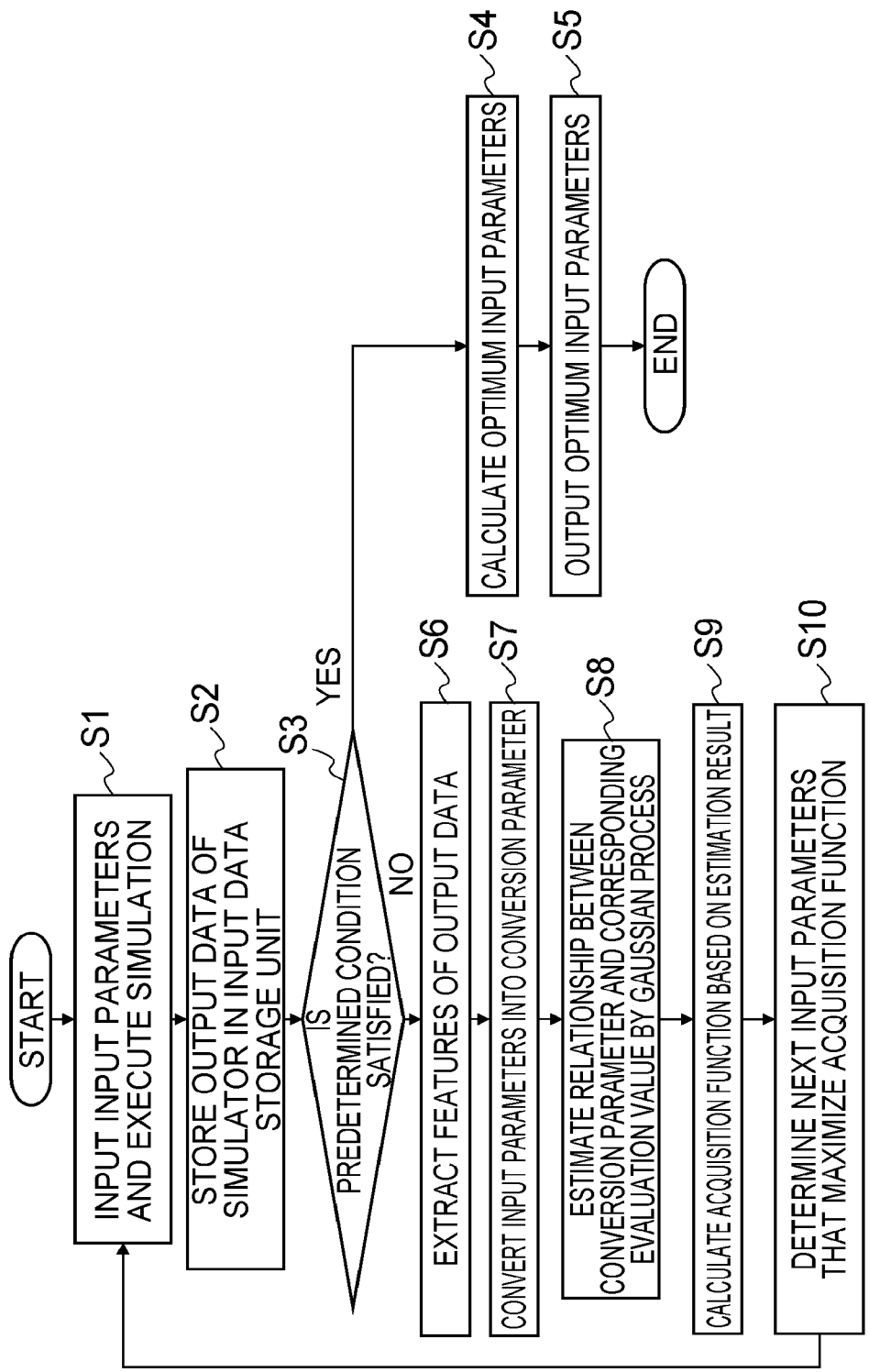
FIG. 5 is a flowchart showing an example of a processing operation of the simulation system.

FIG. 5 is a flowchart showing an example of the processing operation of the simulation system 2. First, input parameters are input to the simulator 3 to execute a simulation (step S1). In this step S1, input parameters may be determined using a Latin square or Sobol sequence.

Next, the output data acquisition unit 4 acquires the output data indicating the simulation result of the simulator 3, and stores the acquired output data in the input/output data storage unit 5 (step S2). When it is determined that the predetermined condition is satisfied (step S3), optimum input parameters are calculated (step S4), and the optimum input parameters are output (step S5). In step S4, for example, the input parameters when the evaluation value calculated by the evaluation value calculation unit 6 becomes maximum (or minimum) may be set as the optimum input parameters. As described above, the optimization device 1 of FIG. 1 may include an optimum input parameter calculation unit that outputs the optimum input parameters.

When it is determined in step S3 that the predetermined condition is not satisfied, the features extraction unit 7 extracts the output data features from the output data (step S6). For example, in the case of using an autoencoder, learning is performed by inputting output data to the autoencoder in which the number of latent dimensions is set to the same number of dimensions as the input parameters. The output data is input to an encoder of the learned autoencoder, and the output value is extracted as the output data features. The learning of the autoencoder may be performed each time the input/output data stored in the input/output data storage unit 5 increases, or may be performed when a predetermined amount of input/output data is added.

Next, the input parameter conversion unit 8 converts the input parameters into the conversion parameter. (Step S7). Specifically, ψ(x) is calculated from the input parameters x and the output data features v, ψ with which the error between v and z=ψ(x) becomes small is calculated, and the output z obtained by inputting x to the calculated ψ is used as the conversion parameter.

Next, the next input parameter determination unit 9 determines the next input parameters based on the pair of the conversion parameter and the corresponding evaluation value (steps S8 to S10). For example, when using Bayesian optimization, first, the relationship between the conversion parameter and the corresponding evaluation value is estimated by the Gaussian process (step S8). Next, the acquisition function is calculated based on the estimation result of step S8 (step S9). Finally, the next input parameters that maximize the acquisition function is determined (S10). After that, the iterative determination unit 10 repeats the process from step S1 onward until a predetermined condition is satisfied.

As described above, in the first embodiment, the output data features having the same number of dimensions as the input parameters is extracted from the output data, the conversion parameter is generated from the input parameters based on the output data features, the next input parameters are determined based on the conversion parameter and the corresponding evaluation value, and execution of the simulation, extraction of the output data features, generation of the conversion parameter, and determination of the next input parameters are repeated until a predetermined condition is satisfied.

For this reason, the original optimization problem that optimizes the input parameters and the evaluation value can be divided into a problem that creates an output data features prediction space that is more directly related to the evaluation value than the input parameters themselves and a problem that predicts the output data features from the input parameters.

The first effect of this is that since the problem setting can be reduced to an optimization problem in a space that is more directly related to the evaluation value than the input parameters themselves by using the fact that the input parameters and the output data are directly related and the output data and the evaluation value are directly related, the optimization efficiency when applying a known optimization method is improved.

The second effect is that since the problem setting can be reduced to a simpler prediction problem than predicting the evaluation value from the input parameters, the evaluation value can be predicted more easily. The problem of matching each dimension value of the shape generated by the simulation with the corresponding dimension value of the ideal shape can be regarded as a multi-objective optimization problem because it can be considered that there is a plurality of types of evaluation values. In general, the multi-objective optimization problem has a trade-off problem. Specifically, when one of the dimensions is adjusted to the ideal shape dimension value, the other dimension is not matched to the ideal shape dimension value. Rather than predicting the evaluation value resulting from such a complicated relationship directly from the input parameters, disentangling the complicated relationship results in solving a simpler and easier problem of predicting the individual output data that are the input of the evaluation value calculation unit 6 from the input parameters. In the calibration of the physical simulation model, since the simulation model is configured only by the model parameters that the human judges to be important, any model parameter is often important. In such a case, it is difficult to expect efficient search by simply reducing the number of parameter dimensions of the simulation model. On the other hand, the number of dimensions of the physical simulation output may be compressed. For example, in an optimization problem of a model parameter that matches a certain physical shape dimension value with an ideal shape dimension value, there are dimensions that easily change and dimensions that do not easily change in the shape that can be generated by simulation. In such a case, for example, if a dimension with a large variance is selected as a dimension that easily changes, it is possible to efficiently represent the shape change with a small number of dimensions, so that the features extraction unit 7 can reduce the number of dimensions of output data, and the error between the shape generated efficiently by simulation and the ideal shape can be efficiently reduced.

The third effect is that since it is not necessary for a person to select output data suitable for optimization from the high-dimensional output data or set an appropriate number of dimensions of the output data features, the optimum input parameters can be set more easily.

The fourth effect is that since it is not necessary to predict the total number of dimensions of the output data, the amount of calculation can be reduced as compared with the method of predicting the total number of dimensions of the output data.

The fifth effect is that since the optimization device according to one embodiment can be utilized even if the calculation formula of the evaluation value calculation function is unknown, it is more versatile than the method using the known evaluation value calculation function form. For example, since evaluation of whether the shapes are similar or not may be made by human subjective judgment, the evaluation value calculation function is not necessarily a white box. However, since it is clear that a person is looking at the dimension value of the shape in the subjective judgement, it is possible to be used as a known fact that the evaluation value is calculated from the output data.

Second Embodiment

Figure 6:
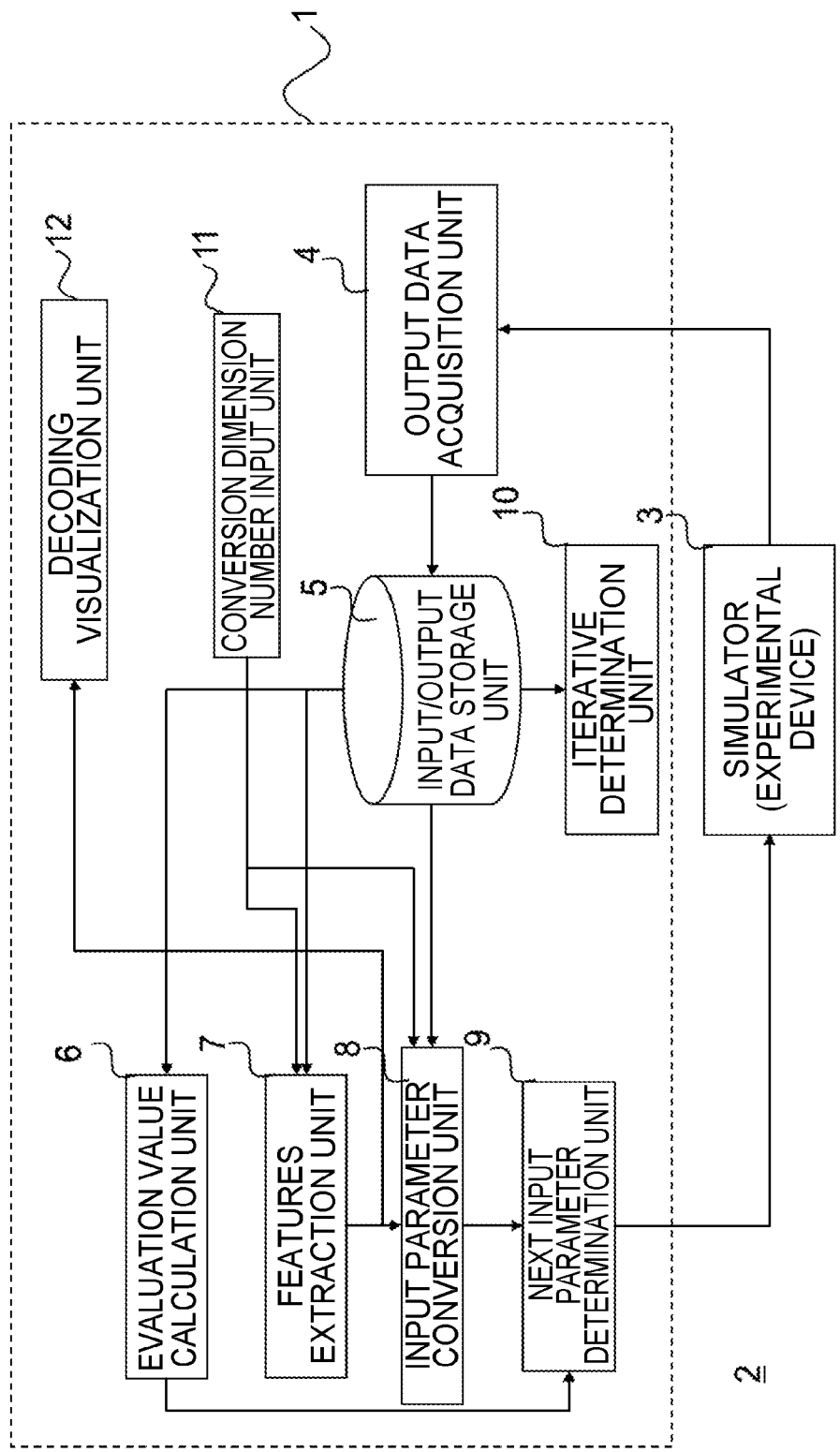
FIG. 6 is a block diagram showing a schematic configuration of a simulation system including an optimization device according to a second embodiment.

FIG. 6 is a block diagram showing a schematic configuration of a simulation system including an optimization device according to the second embodiment. The optimization device 1 of FIG. 6 includes a conversion dimension number input unit 11 and a decoding visualization unit 12 in addition to the configuration of FIG. 1.

The conversion dimension number input unit 11 inputs the number of conversion dimensions to the features extraction unit 7 and the input parameter conversion unit 8. The conversion dimension number input unit 11 determines the number of dimensions after the extraction or conversion in the features extraction unit 7 and the input parameter conversion unit 8. The conversion dimension number input unit 11 may change the number of conversion dimensions during the processing of the optimization device 1. Alternatively, the conversion dimension number input unit 11 may prevent the once input number of conversion dimensions from being changed during the processing of the optimization device 1. The number of conversion dimensions may be gradually changed as the number of conversion dimensions is optimized. As a result, in the second embodiment, the number of features dimensions of the features extraction unit 7 and the number of conversion dimensions of the input parameter conversion unit 8 can be changed unlike the first embodiment.

For example, in the hyperparameter optimization problem of machine learning, it is generally said that there are few hyperparameters effective for optimization. In such a problem that there are few hyperparameters effective for optimization, the number of features dimensions of the features extraction unit 7 and the number of conversion dimensions of the input parameter conversion unit 8 may be set to a number of dimensions smaller than that of the input parameters.

The decoding visualization unit 12 visualizes the recoding result reproduced by the output data features extracted by the features extraction unit 7. The decoding is a process of inversely converting the features into output data. For example, the decoding visualization unit 12 visualizes data obtained by decoding, with the decoder of the autoencoder, the output data features obtained when the output data is input to the encoder of the autoencoder.

Figure 7:
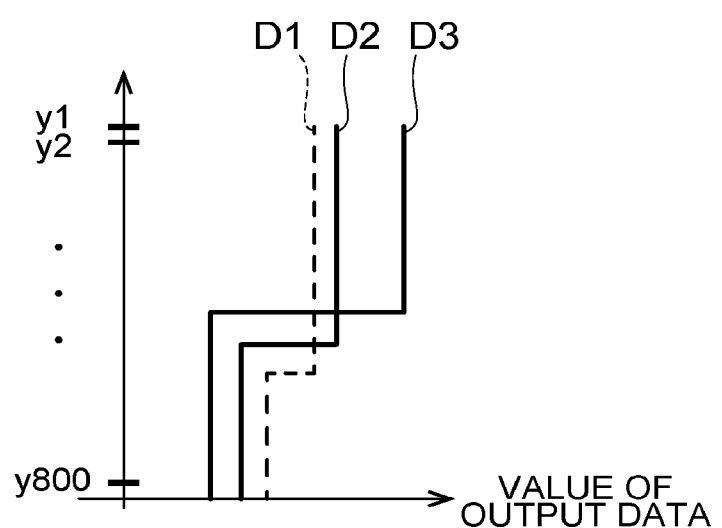
FIG. 7 is a diagram showing an example of visualization by the decoding visualization unit.

FIG. 7 is a diagram showing an example of visualization by the decoding visualization unit 12. A scale is assigned to each dimension of the output data on the vertical axis of FIG. 7, and a value of the dimension of the output data corresponding to the scale is plotted on the horizontal axis, and the plotted points are interpolated and connected. As a specific interpolation method, for example, linear interpolation or spline interpolation may be used. Only points may be plotted without interpolation. For example, if the output data has a horizontal width of a shape at a certain height (corresponding to each dimension), the height of the scale may be visualized so as to be proportional to the actual height.

D1 in FIG. 7 is the output data y1=y1_1, y2=y2_1, ..., y800=y800_1 and input to the features extraction unit 7. D1 is encoded to the output data features by the encoder of the features extraction unit 7 and the output data features are decoded to D2 and D3 by the decoder of the features extraction unit 7 in different settings of the number of conversion dimensions. D2 is the decoding result y1=y1_2, y2=y2_2, ..., y800=y800_2 obtained when the number of conversion dimensions is set to "a". D3 in FIG. 7 is the decoding result y1=y1_3, y2=y2_3, ..., y800=y800_3 obtained when the number of conversion dimensions is set to b (≠a). As shown in FIG. 7, by arranging and visualizing the results of decoding with the number of conversion dimensions different from the value of the output data input to the features extraction unit 7, it is possible to visually determine at which number of conversion dimensions the output data can be successfully reproduced. For example, when visually comparing D2 in FIGS. 7 and D3 in FIG. 7, it can be seen that D2 in FIG. 7 is more similar to D1 in FIG. 7 in general, and it can be seen that the number of conversion dimensions at D2 in FIG. 7 can reproduce the shape more suitably. If the reproducibility is to be compared quantitatively, the error between the dimension value of the shape input to the features extraction unit 7 and the decoding result, and the number of conversion dimensions that gives a smaller error may be set. For example, the error may be the sum of square errors. Specifically, the errors e1=$\tau i \|y2\_i-y1\_i\|$ and e2=$\Sigma i \|y3\_i-y1\_i\|$ may be calculated, and the number of conversion dimensions that gives a smaller error may be used. Here, $\| \|$ may be the Lp norm shown in Expression (5) described later or the infinite norm shown in Expression (6) described later.

In general, in the regression problem, it is said that if the number of dimensions is increased, the expressiveness of a regression model increases, whereas in the optimization problem, it is said that if the number of dimensions is high, the number of trials required for optimization increases. Therefore, the user has to determine, from the visualization result and the error comparison, the smallest possible number of dimensions that can reproduce the important portion of the output data for the user.

As described above, in the second embodiment, the number of dimensions of the output data features output by the features extraction unit 7 and the number of conversion dimensions that is the number of dimensions of the conversion parameter output by the input parameter conversion unit 8 can be input. When the prior knowledge that the number of effective dimensions is small can be used, the user can efficiently set the optimum input parameters by utilizing the low effective dimensionality by making the number of conversion dimensions smaller than the input parameters. Even if there is no such prior knowledge, the number of conversion dimensions necessary to reproduce the output data can be easily determined based on the visualization result of the decoding visualization unit 12. When the output data has a certain physical characteristic value or a certain shape, the portion to be reproduced may differ depending on the user of the optimization device 1, and it may be difficult to formulate the degree of reproduction. Even in such a case, the user can easily grasp the influence of the number of conversion dimensions by visualizing the decoding.

Third Embodiment

The next input parameter determination unit 9 has an output result estimation function, an acquisition function calculation function (acquisition function generation unit), and an acquisition function maximization function (acquisition function maximization unit).

The output result estimation function estimates a posterior probability p (y|z) of an evaluation value y calculated by the Bayes rule for the conversion parameter z based on the pair of the conversion parameter and the corresponding evaluation value.

The acquisition function calculation function calculates an acquisition function based on the posterior probability calculated by the Bayes rule. That is, the acquisition function calculation function generates an acquisition function based on the conversion parameter. As the acquisition function, for example, PI (Probability of Improvement) may be used, or EI (Expected Improvement) may be used. Alternatively, UCB (Upper Confidence Bound), TS (Thompson Sampling), ES (Entropy Search), or MI (Mutual Information) may be used. For example, in the case of PI, an acquisition function an(z) is calculated by following Expression (3) using an arbitrary constant Tn.

$$\alpha_n(z) = \int_{\tau_n}^{\infty} p(y|z) dy \qquad (3)$$

The acquisition function maximization function is a function of calculating the next input parameter that maximizes the acquisition function. For example, the conversion parameter $z_{n+1}$=argmax$_z \alpha_n(z)$ that maximizes the acquisition function is obtained, and the next input parameter may be calculated as $x_{n+1}=\varphi^{-1}(z_{n+1})$ by using the inverse function $\varphi^{-1}$ (z) of conversion φ. Since the number of dimensions is reduced in the conversion, the inverse function of the conversion has a degree of freedom corresponding to the reduction in the number of dimensions. In this regard, the remaining degrees of freedom may be randomly determined. Alternatively, the remaining degrees of freedom may be determined so that the distance to the input parameters having the largest (smallest) evaluation value at the present time becomes the minimum. Alternatively, the acquisition function may be considered as a function of the input parameter x such as $\alpha n(\varphi)(x))$, and the input parameter $x_{n+1}$=argmax$_x \alpha_n(\varphi)(x))$ that maximizes the acquisition function may be calculated directly. Since this method does not require the inverse conversion $\varphi^{-1}(z)$, it is possible to use the conversion φ for which the inverse conversion cannot be calculated. Any optimization method may be used to maximize the acquisition function. For example, full search, random search, grid search, gradient method, L-BFGS, DIRECT, CMA-ES, or multi-start local method may be used.

Fourth Embodiment

The fourth embodiment is to determine the next input parameter by Bayesian optimization. The schematic configuration of an optimization device 1 according to the fourth embodiment is similar to that of FIG. 1, and thus the description of the block configuration will be omitted.

The next input parameter determination unit 9 according to the fourth embodiment has an output result estimation function, an acquisition function calculation function (acquisition function generation unit), and an acquisition function maximization function (acquisition function maximization unit).

The output result estimation function estimates a relational expression of the conversion parameters and the average value of the evaluation values, and the variance of the evaluation values based on the pair of the conversion parameters and the corresponding evaluation values. Gaussian process regression may be used or random forest regression may be used as the method of estimating the relational expression of the average value and the variance. For example, in the case of Gaussian process regression, the conversion parameter of the i-th experiment is zi and the evaluation value is yi. The average value vector of the evaluation values is $mi=\mu_0(zi)$, and the covariance of zi and zj is $Ki, j=k(zi, zj)$. Here, $\mu_0(zi)$ is an arbitrary function, and $k(zi, zj)$ is an arbitrary kernel function. The kernel function may be, for example, an exponential square kernel, a matern kernel, or a linear kernel.

At this time, the relational expression $\mu_n(z)$ between the conversion parameter z and the average value of the evaluation value y is $\mu_n(z)=\mu_0(z)+k(z)^T(K+\sigma^2 I)^{-1}(y-m)$. Here, $ki(z)=k(z, zi)$ and $\sigma^2$ is an arbitrary constant. Further, the relational expression $\sigma_n^2(z)$ between the conversion parameter z and the variance of the evaluation value y is $\sigma_n^2(z)=k(z, z)-k(z)^T(K+\sigma^2 I)^{-1}k(z)$.

The acquisition function calculation function calculates an acquisition function based on the relational expression of the average value and the relational expression of the variance. That is, the acquisition function calculation function generates the acquisition function based on the relational expression regarding the average value and the variance of the conversion parameters and the corresponding evaluation values. As the acquisition function, for example, PI (Probability of Improvement) may be used, or EI (Expected Improvement) may be used. Alternatively, UCB (Upper Confidence Bound), TS (Thompson Sampling), ES (Entropy Search), or MI (Mutual Information) may be used. For example, in the case of UCB, the acquisition function $an(z)$ is calculated as $\alpha n(z)=\mu_n(z)+\beta_n \sigma n(z)$ using an arbitrary constant $\beta n$.

The acquisition function maximization function is a function of calculating the next input parameter that maximizes the acquisition function. For example, the conversion parameter $z_{n+1}=\mathrm{argmax}_z \alpha_n(z)$ that maximizes the acquisition function is obtained, and the next input parameter may be calculated as $x_{n+1}=\varphi^{-1}(z_{n+1})$ by using the inverse function $\varphi^{-1}(z)$ of conversion $\varphi$. Since the number of dimensions is reduced in the conversion, the inverse function of the conversion has a degree of freedom corresponding to the reduction in the number of dimensions. In this regard, the remaining degrees of freedom may be randomly determined. Alternatively, the remaining degrees of freedom may be determined so that the distance to the input parameters having the largest (smallest) evaluation value at the present time becomes the minimum. Alternatively, the acquisition function may be considered as a function of the input parameter x such as $\alpha n(\varphi)(x))$, and the input parameter $x_{n+1}=\mathrm{argmax}_x \alpha n(\varphi)(x))$ that maximizes the acquisition function may be calculated directly. Since this method does not require the inverse conversion $\varphi^{-1}(z)$, it is possible to use the conversion $\varphi$ for which the inverse conversion cannot be calculated. Any optimization method may be used to maximize the acquisition function. For example, full search, random search, grid search, gradient method, L-BFGS, DIRECT, CMA-ES, or multi-start local method may be used.

Thus, in the fourth embodiment, when Bayesian optimization is performed, since the input parameters are converted to the conversion parameter that is more directly related to the evaluation value than the input parameters themselves, and the next input parameters are calculated based on the conversion parameter and the evaluation value, the input parameter optimization process can be performed quickly regardless of the number of dimensions of the input parameters.

Fifth Embodiment

The fifth embodiment optimizes the number of conversion dimensions without depending on the user.

Figure 8:
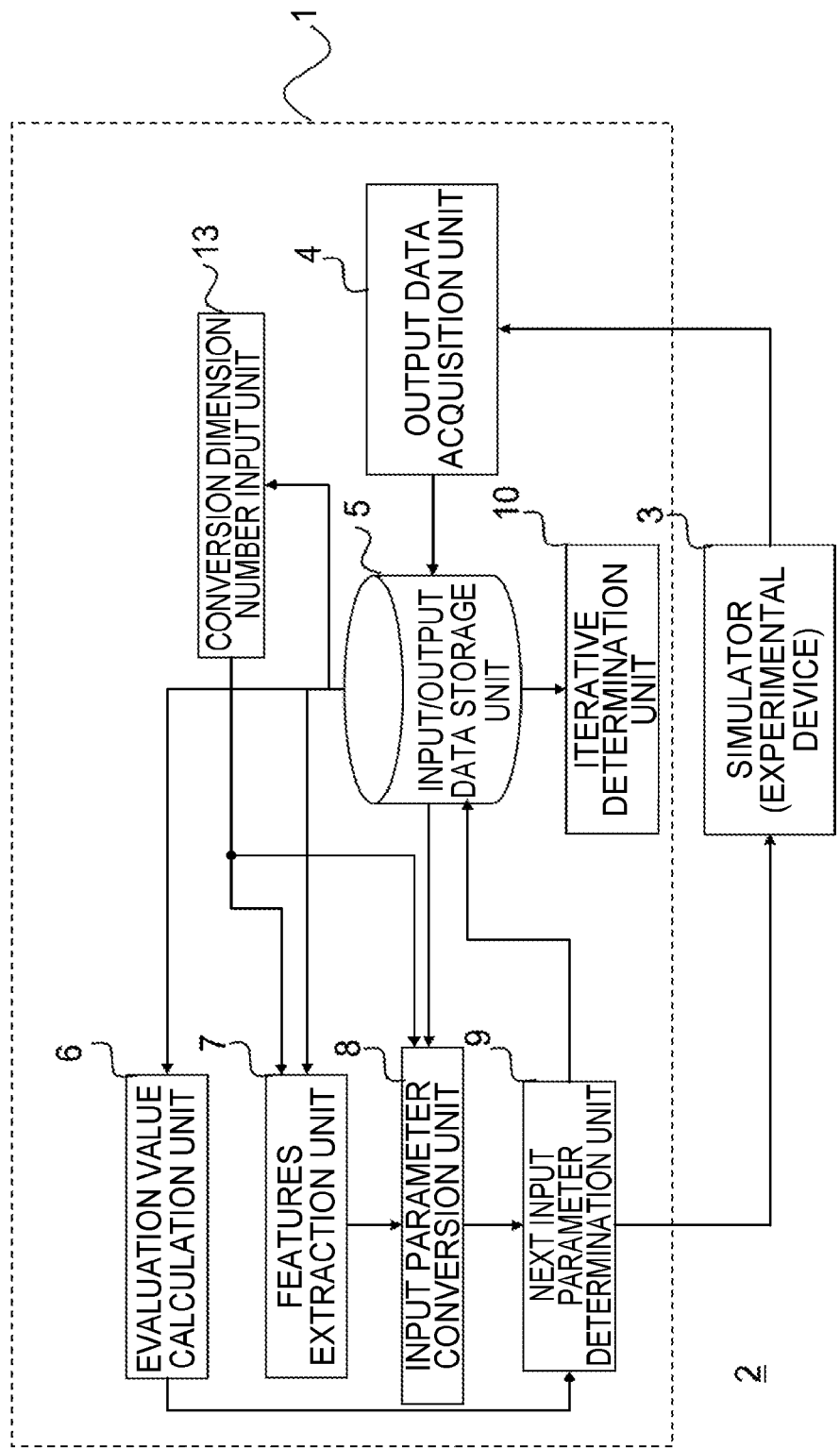
FIG. 8 is a block diagram showing a schematic configuration of a simulation system including an optimization device according to a fifth embodiment.

FIG. 8 is a block diagram showing a schematic configuration of a simulation system including an optimization device according to the fifth embodiment. The optimization device 1 of FIG. 8 includes a conversion dimension number optimization unit 13 in addition to the configuration of FIG. 1. The conversion dimension number optimization unit 13 optimizes the number of conversion dimensions input to the features extraction unit 7 and the input parameter conversion unit 8. More specifically, the conversion dimension number optimization unit 13 determines the numbers of conversion dimensions of the output data features and the conversion parameter based on the error between the evaluation value estimated from the conversion parameter and the evaluation value calculated by the evaluation value calculation unit 6.

Figure 9:
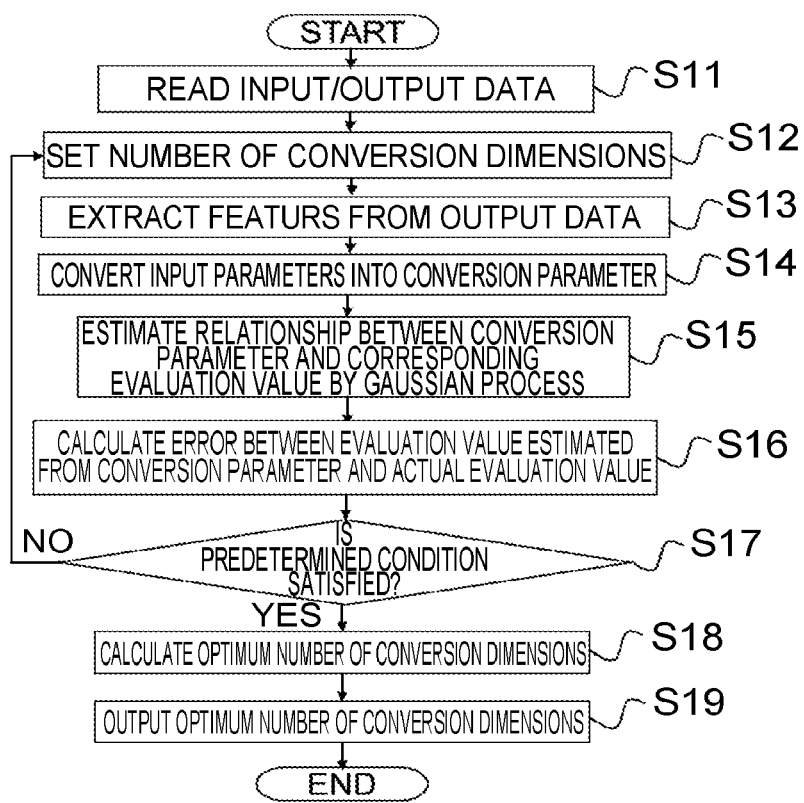
FIG. 9 is a flowchart showing an example of a processing operation of a conversion dimension number optimization unit.

FIG. 9 is a flowchart showing an example of a processing operation of the conversion dimension number optimization unit. First, the input parameters and the evaluation value are read from the input/output data storage unit 5 (step S11). Next, the number of conversion dimensions is set (step S12). The setting of the number of conversion dimensions may be performed by randomly selecting the number of conversion dimensions or may be determined by using an optimization method such as GA. Then, the features extraction unit 7 extracts the features (output data features) from the output data (step S13), the input parameter conversion unit 8 receives the output data features and the input parameters to generate the conversion parameter (Step S14), and the relationship between the conversion parameter and the corresponding evaluation value is estimated by the Gaussian process (step S15). Then, an error between the evaluation value estimated from the conversion parameter and the actual evaluation value is calculated (step S16). Here, the error may be the sum of square errors between the estimated value $\mu_n(z)$ of the evaluation value and the actual evaluation value. Then, it is confirmed whether a predetermined condition is satisfied (step S17). The predetermined condition is, for example, that the upper limit of the number of trials and errors of setting the number of conversion dimensions has been reached, or the error has fallen below a predetermined standard. If the predetermined condition is not satisfied, the process returns to step S12. If the predetermined condition is satisfied, the optimum number of conversion dimensions is calculated (step S18), and the calculated optimum number of conversion dimensions is output (step S19).

As described above, the fifth embodiment can determine the number of conversion dimensions without depending on the user. In addition, by determining the number of conversion dimensions so that the accuracy of the estimated value of the evaluation value increases, the accuracy of prediction of the evaluation value can be increased and the optimum input parameters can be easily predicted.

Sixth Embodiment

The sixth embodiment relates to handling when data that violates a constraint is obtained when an experiment or simulation is performed using input parameters.

Figure 10:
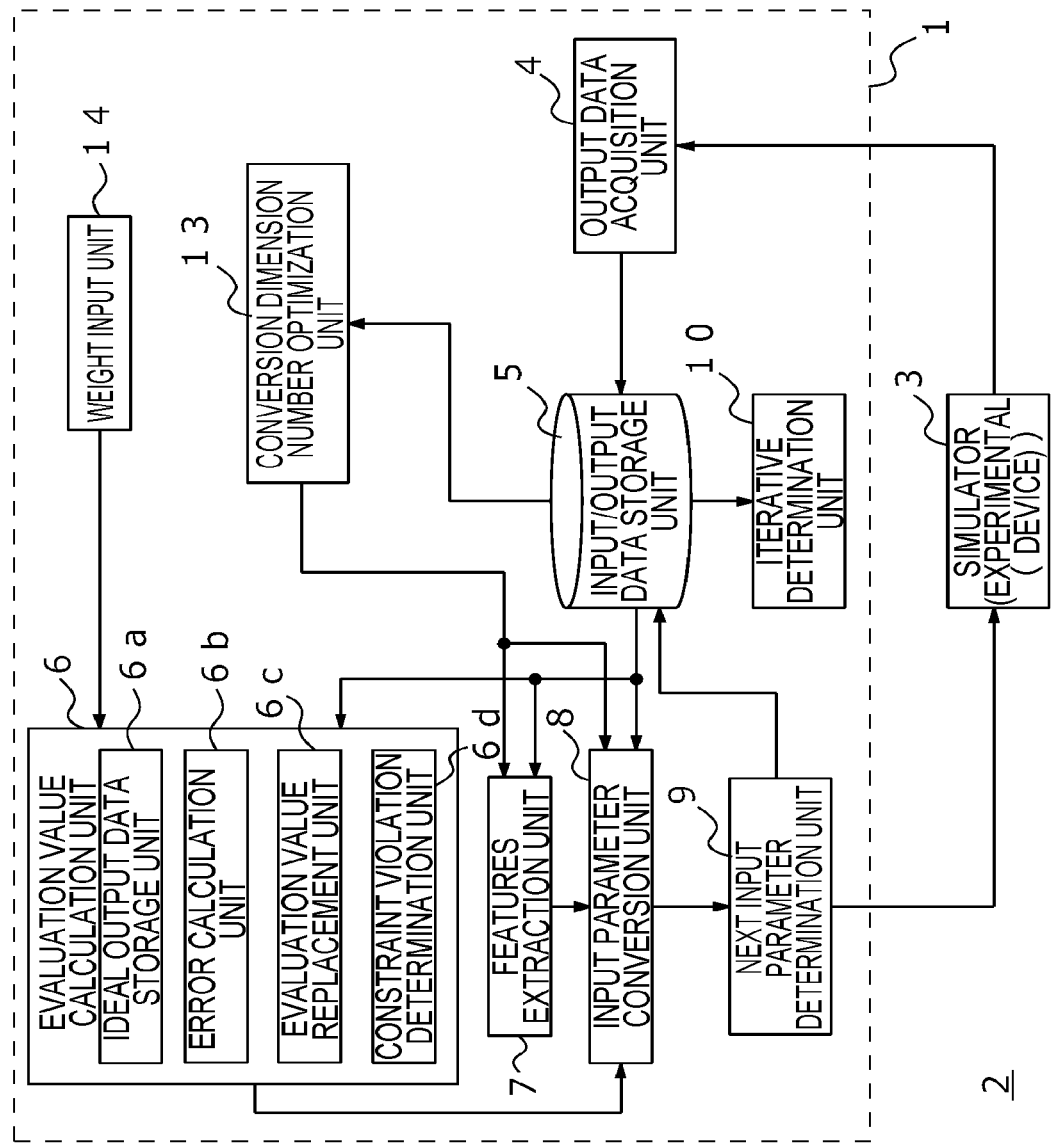
FIG. 10 is a block diagram showing a schematic configuration of a simulation system including an optimization device according to a sixth embodiment.

FIG. 10 is a block diagram showing a schematic configuration of a simulation system 2 including an optimization device 1 according to the sixth embodiment. The simulation system 2 of FIG. 10 is different from that of FIG. 8 in the internal configuration of the evaluation value calculation unit 6 in the optimization device 1, and is different from FIG. 8 in that a weight input unit 14 is added. Other than that, the configuration is similar to that of FIG. 8.

The evaluation value calculation unit 6 of FIG. 10 includes an ideal output data storage unit 6a, an error calculation unit 6b, and an evaluation value replacement unit 6c. The ideal output data storage unit 6a stores an ideal experimental or simulation output result. For example, when the items of output data are y1, y2, . . . , y10, the ideal output result may be 10 values corresponding to these 10 items, or values of some items.

The error calculation unit 6b calculates the error between the output data of the experiment or simulation and the ideal output result as the evaluation value. For example, when the output data of the i-th item obtained by an experiment or simulation is yi, and the ideal output result of the i-th item is yi bar (in this specification, a symbol with a horizontal line above is denoted by a "symbol bar"), the error y is expressed by following Expression (4).

$$y = \Sigma_i \|y_i - \bar{y}_i\| \quad (4)$$

Here, $\|\ \|$ may be the Lp norm shown in Expression (5) or the infinite norm shown in Expression (6).

$$\|q\|^p \sqrt{\Sigma_j |q_j|^2} \quad (5)$$

$$\|q\| = \max_j |q_j| \quad (6)$$

If there is a priority of fitting for the user, weight wi may be added to the calculation of the error in each dimension of the output data. The output data y in this case is expressed by Expression (7) using the weight wi.

$$y = \Sigma_i \|w_i (y_i - \bar{y}_i)\| \quad (7)$$

Since it is a heavy load for the user to weight each of the high-dimensional output data one by one, it is possible to collectively specify the weight for each region while looking at the ideal data in order to reduce the load. The weight input unit 14 in FIG. 10 is a user interface for collectively setting error weights. The weight input unit 14 inputs error weights corresponding to each dimension of output data. The evaluation value calculation unit 6 calculates the evaluation value based on the error weights based on the input weights.

Figure 11:
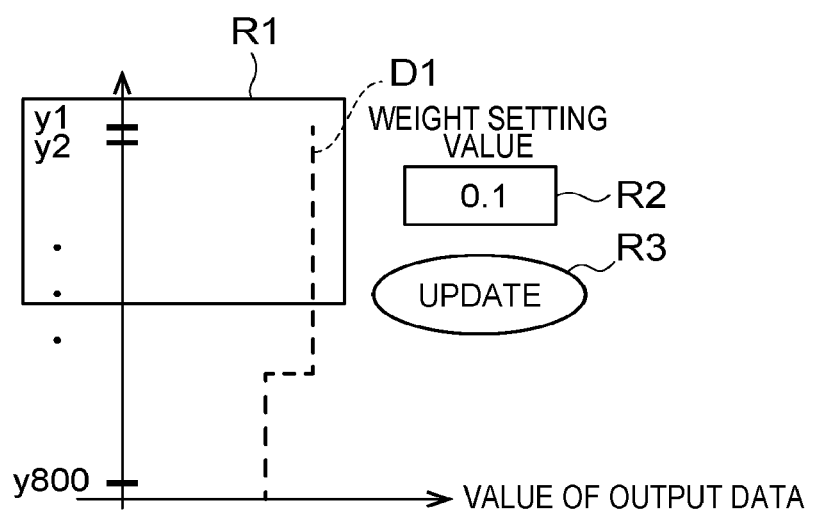
FIG. 11 is a diagram showing an example of a user interface for collectively specifying error weights.

FIG. 11 is an example of a user interface (weight input unit 14) for collectively specifying error weights. D1 in FIG. 11 is the ideal data, and the dimension of the weight update target is selected by specifying a region of R1 in FIG. 11 so as to surround a part of the y dimensions of the ideal data. In the region of R1 in FIG. 11, the upper left point of the region may be specified by clicking the mouse, and then the mouse may be dragged to specify the point where the drag is released as the lower right point of the region. After selecting the y dimensions, input the value of the weight to be collectively set in the input field of R2 in FIG. 11 and click the update button of R3 in FIG. 11 to collectively update the weight. The updated weight may be stored in the input/output data storage unit 5, or may be stored in another storage unit. FIG. 12 is an example of a method of storing each dimension and a corresponding weight.

The weight for the error in each dimension of the output data may be determined based on the history of the error in each dimension without depending on the user. For example, the history of the error rate may be calculated from the history of the value in each dimension of the output data and the value in each dimension of the ideal output result, and the average value of the error rates may be used as the weight in each dimension. For example, if there is a history as shown in FIG. 3 as input/output data, in order to determine a weight of a dimension of y1, when following Expression (8) is calculated for the data in the column of y1 in FIG. 3 by the number of rows in FIG. 3 to determine the average value as the weight wi of the dimension of y1, the weight of the dimension of yi can be calculated in the same manner.

$$(y_1 - \bar{y}_1)/\sqrt{\bar{y}_1} \quad (8)$$

The evaluation value calculation unit 6 may include a constraint violation determination unit 6d. The constraint violation determination unit 6d determines whether the output data violates the constraint. The evaluation value calculation unit 6 may perform the process of the evaluation value replacement unit 6c when the constraint violation determination unit 6d determines that the output data violates the constraint. When it is determined that the output data corresponding to certain input parameters violates the constraint, the evaluation value replacement unit 6c replaces the evaluation value with an evaluation value corresponding to other input parameters whose output data does not violate the constraint. The evaluation value replacement unit 6c may replace the evaluation value in consideration of the case where the experiment or the simulation violates the constraint. Here, the violation to the constraint may be failure. Failure means that a part of output data is lost for certain input parameters. For example, it is a failure that the product of the experiment cannot be made and, as a result, a part of the output data is lost, or the result is not returned due to a simulation bug. Alternatively, it is also a failure if the experimental result exceeds the assumption and the output data is lost because measurement is not possible. Since the output data is lost, there are input parameters whose evaluation value also becomes a loss value.

The violation to the constraint may be that the output data does not comply with the constraint expression that should be satisfied. For example, even when a part of the output data is not lost, if the output data does not comply with the required constraint and should be avoided, it may be the violation to the constraint. For example, if there is an optimal standard that the value of the first dimension of the output data must be greater than 10, then the data where $y_1$ of the first dimension of the output data is not greater than 10, that is, the data that does not satisfy $y_{1>10}$ may be determined as input parameters of constraint violation. Alternatively, when the output data is the dimension value of the shape and does not satisfy the feature of a certain shape, the output data may be determined as constraint violation data. For example, when the shape must be zigzag, the difference between adjacent output data is calculated, and if the positive and negative constraints are not satisfied, it may be determined as a violation. For example, $y_1 - y_{2<0}$ and $y_2 - y_{3>0}$ are defined as constraints, and a violation is determined if these constraints are not satisfied, and the relationship that must be satisfied between each dimension of the output data is defined as a constraint, and the output data may be determined as input parameters of constraint violation depending on whether or not the output data violates the constraint.

The evaluation value replacement unit 6c may replace the evaluation value corresponding to such input parameters of constraint violation with the maximum value or the minimum value of the evaluation values of other experiments that are not constraint violation. That is, when the evaluation value of the n-th experiment that is not constraint violation is yn, $\min_n y_n$ or $\max_n y_n$ may be used instead of the evaluation value corresponding to the input parameters of constraint violation.

For example, the evaluation value replacement unit 6c, when maximizing the evaluation value for the input parameters that the experiment or simulation has failed, replaces the evaluation value in this case with the minimum value of the evaluation value of other input parameters that the experiment or simulation has not failed. Similarly, the evaluation value replacement unit 6c, when minimizing the evaluation value for the input parameters that cause the experiment or simulation to fail, replaces the evaluation value in this case with the maximum value of the evaluation value of other input parameters that cause the experiment or simulation to success.

As described above, in the sixth embodiment, the evaluation value when the experiment or simulation for certain input parameters has failed is replaced based on the evaluation value of the other input parameters for which the experiment or simulation has not failed. Thus, even if the experiment or simulation has failed due to circumstances, there is no risk of optimizing the input parameters based on an inappropriate evaluation value. Not only that, but the evaluation value of the data that dissatisfies the constraint expression that the output data should satisfy is also replaced, and thus a penalty is given so that the data that dissatisfies the constraint is avoided. Although superficially the evaluation value looks good, input parameters of constraint violation can be avoided.

Seventh Embodiment

Figure 13:
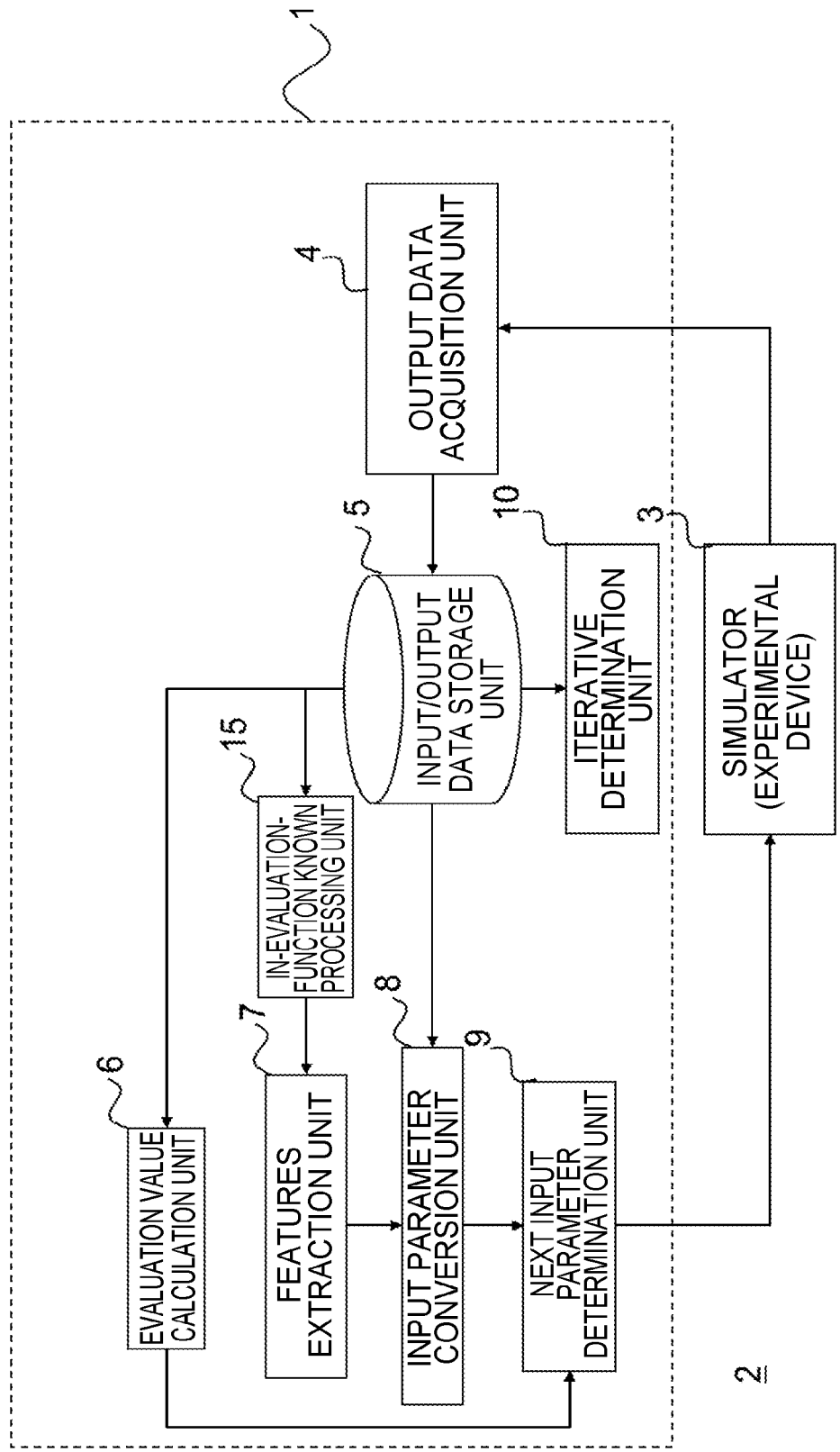
FIG. 13 is a block diagram showing a schematic configuration of a simulation system including an optimization device according to a seventh embodiment.

The seventh embodiment relates to handling when processing performed on the output data inside the evaluation function is known. FIG. 13 is a block diagram showing a schematic configuration of a simulation system 2 including an optimization device 1 according to the seventh embodiment. The simulation system 2 of FIG. 13 has a configuration in which an in-evaluation-function known processing unit 15 is added to FIG. 1, and is otherwise configured similarly to FIG. 1. In the optimization device 1 of FIG. 13, the conversion dimension number input unit 11 is omitted.

The in-evaluation-function known processing unit 15 of FIG. 13 inputs, to the features extraction unit 7, the output data after the in-evaluation-function known processing in which the known processing in the evaluation value calculation unit 6 is applied to the output data read from the input/output data storage unit 5, and the corresponding input parameters. The features extraction unit 7 and the input parameter conversion unit 8 perform each process based on the output data after the in-evaluation-function known processing.

In this way, the in-evaluation-function known processing unit 15 performs, separately from the evaluation value calculation unit, the process performed on the output data by the evaluation value calculation unit to calculate the evaluation value. The features extraction unit 7 extracts the output data features based on the processing result performed by the known processing execution unit.

For example, when Expression (4) is used as the error for calculating the evaluation value, it can be seen that for the output data $y_1$, the error is calculated after performing the process of Expression (9) in the evaluation function for calculating the evaluation value.

$$y_i - \bar{y}_i \tag{9}$$

Therefore, yi 'of Expression (10) after the in-evaluation-function known processing is newly input to the features extraction unit 7, and the function φ that reduces the number of dimensions of y'=) is calculated.

$$y_i' = y_i - \bar{y}_i \tag{10}$$

As described above, in the seventh embodiment, when the processing to be performed on the output data inside the evaluation function is known, it is possible to learn a direct features with the evaluation value by extracting the features from the output data after the internal processing. Therefore, it is easy to predict the evaluation value, and optimum parameters can be set quickly.

The optimization device 1 according to the first to seventh embodiments described above can be applied to experiments and simulations of various events. As a specific example of the optimization device 1 according to the first to seventh embodiments, it is conceivable to optimize the input parameters so that the semiconductor device has a predetermined shape. In recent semiconductor devices, film forming conditions such as temperature and materials are finely controlled, a large number of films are laminated, and then processed into a desired shape by lithography or the like in many cases. In order to evaluate whether or not the shape of the finally obtained semiconductor device is the desired shape, the optimization device 1 according to the first to seventh embodiments can be used. In this case, the input parameters are the film forming conditions described above. The input parameters include a plurality of items such as film forming temperature, materials, and film forming time. By adjusting these items, the shape of the finally obtained semiconductor device changes. Therefore, by using the above-described optimization device 1, the optimum input parameters can be selected so that the semiconductor device has a desired shape.

At least a part of the optimization device 1 and the simulation system 2 described in each of the above-described embodiments may be configured by hardware or software. When configured by software, a program that realizes at least a part of the functions of the optimization device 1 and the simulation system 2 may be stored in a recording medium such as a flexible disk or a CD-ROM, read by a computer, and executed. The recording medium is not limited to a removable medium such as a magnetic disk or an optical disk, but may be a fixed recording medium such as a hard disk device or a memory.

Further, the program that realizes at least a part of the functions of the optimization device 1 and the simulation system 2 may be distributed via a communication line (including wireless communication) such as the Internet. Further, the program may be distributed in a state of being encrypted, modulated, or compressed via a wired line or a wireless line such as the Internet or stored in a recording medium.

The invention claimed is:

1. A system, comprising:
processing circuitry configured to:
acquire output data having a second number of dimensions obtained by performing an experiment or a simulation based on input parameters having a first number of dimensions;
store the input parameters and the corresponding output data as a pair;
calculate and output an evaluation value of the output data;
extract output data features having a third number of dimensions different from the second number of dimensions;
generate a conversion parameter related to the output data features predicted from the input parameters;
determine a next input parameter to be acquired, based on the conversion parameter and the corresponding evaluation value;
repeat processes of acquiring the output data, storing the input parameters and the corresponding output data, calculating and outputting the evaluation value, extracting the output data features, generating the conversion parameter, and determining the next input parameter, until a predetermined condition is satisfied;
perform the experiment or the simulation using the next input parameter; and process a semiconductor into a desired shape based upon the next input parameter.

2. The system according to claim 1, wherein the processing circuitry is configured to extract the output data features having the third number of dimensions smaller than the second number of dimensions.

3. The system according to claim 2, wherein
the second number of dimensions is greater than the first number of dimensions, and
the third number of dimensions is the same as the first number of dimensions.

4. The system according to claim 1, wherein the processing circuitry is configured to extract the output data features from the output data.

5. The system according to claim 4, wherein the processing circuitry is configured to use a dimension having the maximum variance as the output data features in the output data.

6. The system according to claim 4, wherein the processing circuitry is configured to use a dimension having the greatest independence as the output data features in the output data.

7. The system according to claim 4, wherein the processing circuitry is configured to input the output data to an input layer of a neural network having an input layer, an intermediate layer, and an output layer, learn a weight of each path connecting the input layer, the intermediate layer, and the output layer so that an error between the output data input to the input layer and the data output from the output layer is minimized, and use data output from the intermediate layer as the output data features.

8. The system according to claim 1, wherein the processing circuitry is configured to extract the output data features based on the output data and the evaluation value.

9. The system according to claim 8, wherein the processing circuitry is configured to use, as the output data features, a dimension corresponding to a regression coefficient that exceeds a predetermined threshold among regression coefficients when the evaluation value is predicted from the output data.

10. The system according to claim 8, wherein the processing circuitry is configured to use, as the output data features, a dimension corresponding to an importance exceeding a predetermined threshold among importance of the output data calculated by random forest regression of the evaluation value from the output data.

11. The system according to claim 1, wherein the processing circuitry is configured to output the input parameters when the predetermined condition is satisfied, as optimum input parameters.

12. The system according to claim 1, wherein the processing circuitry is configured to use, as the conversion parameter, a value calculated by giving the input parameters to a function used to predict the output data features.

13. The system according to claim 1, wherein the processing circuitry is configured to visualize information generated by inversely converting the output data features.

14. The system according to claim 1, wherein the processing circuitry is configured to:
generate an acquisition function based on the conversion parameter, and determine the next input parameter so that the acquisition function is maximized.

15. The system according to claim 1, wherein the processing circuitry is configured to:
generate an acquisition function based on a relational expression regarding the conversion parameters and an average value and a variance of the conversion parameters, and
determine the next input parameter so that the acquisition function is maximized.

16. The system according to claim 1, wherein the processing circuitry is configured to determine numbers of conversion dimensions of the output data features and the conversion parameters based on an error between an evaluation value estimated from the conversion parameters and a calculated evaluation value.

17. The system according to claim 1, wherein the processing circuitry is configured to:
determine whether the output data violates a constraint, and
replace, when it is determined that the output data corresponding to certain input parameters violates the constraint, the evaluation value with an evaluation value corresponding to other input parameters whose output data does not violate the constraint.

18. The system according to claim 17, wherein the processing circuitry is configured to, when it is determined that the output data corresponding to the certain input parameters violates the constraint, replace the evaluation value to be maximized with the minimum evaluation value of the other input parameters, or replace the evaluation value to be minimized with the maximum evaluation value of the other input parameters.

19. The system according to claim 1, wherein the processing circuitry is configured to calculate the evaluation value based on an error between the output data obtained by experiment or simulation and ideal output data.

20. The system according to claim 19, wherein the processing circuitry is configured to determine a weight of the error corresponding to each dimension of the output data from a history of the error.

21. The system according to claim 19, wherein the processing circuitry is configured to:
input a weight of the error corresponding to each dimension of the output data, and
calculate the evaluation value based on the error weights based on the input weights.

22. The system according to claim 1, wherein the processing circuitry is configured to:
perform a process performed for the output data by the evaluation value calculator to calculate the evaluation value, separately from the evaluation value calculator, and
extract the output data features based on a result of the process.

23. A method comprising:
acquiring output data having a second number of dimensions obtained by performing an experiment or a simulation based on input parameters having a first number of dimensions;
storing the input parameters and the output data corresponding thereto as a pair in an input/output data storage;
calculating and outputting an evaluation value of the output data;
extracting output data features having a third number of dimensions different from the second number of dimensions;
generating a conversion parameter related to the output data features predicted from the input parameters;
determining a next input parameter to be acquired based on the conversion parameter and the evaluation value corresponding thereto;
repeating a process of acquiring the output data, a storage process in the input/output data storage, a process of calculating the evaluation value, a process of extracting the output data features, a process of converting the input parameters, and a process of determining the next input parameter until a predetermined condition is satisfied;
performing the experiment or the simulation using the next input parameter; and processing a semiconductor into a desired shape based upon the next input parameter.

* * * * *